United States Patent [19]

St. Germain

[11] Patent Number: 5,577,799
[45] Date of Patent: Nov. 26, 1996

[54] COLLAPSIBLE TUBULAR ROCKING CHAIR FRAME

[76] Inventor: Robert J. St. Germain, 44 Gorman St., Naugatuck, Conn. 06770

[21] Appl. No.: 558,471

[22] Filed: Nov. 16, 1995

Related U.S. Application Data

[63] Continuation-in-part of Ser. No. 443,340, Mar. 17, 1995, Pat. No. 5,476,308.

[51] Int. Cl.[6] .................................................... A47C 4/28
[52] U.S. Cl. ........................... 297/35; 297/18; 297/40; 297/41; 297/55; 297/56; 297/53; 403/102; 403/315; 403/316
[58] Field of Search ........................... 297/18, 35, 40, 297/41, 55, 56, 53; 403/102, 315, 316

[56] References Cited

U.S. PATENT DOCUMENTS

| | | | |
|---|---|---|---|
| 2,708,960 | 5/1955 | Shepard | 297/41 |
| 2,708,962 | 5/1955 | Rechler | 297/35 |
| 2,741,298 | 4/1956 | Roberts III | 297/56 |
| 3,047,333 | 7/1962 | Stanimir | 297/35 |
| 3,112,953 | 12/1963 | Raver | 297/18 |
| 3,154,344 | 10/1964 | Stableford | 297/40 |
| 3,338,625 | 8/1967 | Jung-Shien | 297/18 |
| 4,934,025 | 6/1990 | Mariol | 403/102 X |
| 5,211,498 | 5/1993 | Huang | 403/102 |
| 5,255,993 | 10/1993 | Kovacs | 403/316 X |
| 5,439,309 | 8/1995 | Raz | 403/316 |
| 5,457,828 | 10/1995 | Huang | 403/102 X |
| 5,474,404 | 12/1995 | Chien | 403/102 |
| 5,483,710 | 1/1996 | Chan | 403/102 X |

*Primary Examiner*—Peter M. Cuomo
*Assistant Examiner*—Stephen Vu
*Attorney, Agent, or Firm*—Dallett Hoopes

[57] ABSTRACT

A foldable tubular rocking chair frame comprises an elongate generally open rectangular back unit having parallel long side elements and parallel upper and lower end elements, the long sides being interrupted by selectively foldable aligned hinges. The hinges include knuckle elements which permit 180° folding, and folding in one direction only. The hinges, when the chair is erected, include a supporting sleeve which circumposes the interruption and prevents folding.

3 Claims, 2 Drawing Sheets

COLLAPSIBLE TUBULAR ROCKING CHAIR FRAME

REFERENCE TO RELATED APPLICATIONS

This application is a continuation-in-part of the application Ser. No. 08/443,340, filed May 17, 1995 now U. S. Pat. No. 5,676,308.

BACKGROUND OF THE INVENTION

This invention relates to a collapsible tubular rocking chair frame. More specifically, the invention relates to such a collapsible frame in which a major elongate frame element is interrupted by hinge means to make it foldable and movable tubular support means for holding the hinge means in a fixed linear position so that the frame element is held in its set-up condition.

The prior art includes a number of patents disclosing tubular-framed chairs wherein the seat and back panel is in the form of a fabric web. Among the chairs disclosed in the prior art having such structure is the rockable chair of deck or lawn type disclosed in the U.S. Pat. No. 2,675,059 to W. C. Martin issued Apr. 13, 1954.

Chairs of this general type in the prior art have often not been readily collapsible: a major elongate element has been one rigid piece which has, of course, made the chair difficult to move and space-consuming to store.

SUMMARY OF THE INVENTION

Under the present invention there is provided a tubular rocking chair frame comprising in an elongate generally open rectangular back unit having parallel long side elements and parallel upper and lower end elements, the long sides being interrupted by selectively foldable aligned hinges. The frame further comprises a generally U-shaped arm unit having a forward bight and rearward legs, the arm unit legs pivotally attached at their distal ends to the respective long sides of the back unit above the hinges. There is further a generally U-shaped rear unit having a rearward and downward bight and upward legs, the distal ends of the rear unit upward legs being pivotally attached to the respective arm unit legs adjacent the bight of the arm element. The frame also comprises a pair of linear stabilizing elements, one on each side of the frame having opposite ends pivotally connected to a long side element of the back unit adjacent the lower end element and to a rear unit leg adjacent the rear unit bight.

BRIEF DESCRIPTION OF THE DRAWINGS

Further objects and features of the invention will be understood by those skilled in the art from reference to the following specification including the drawings, all disclosing a non-limiting form of the invention. In the drawings.

DESCRIPTION OF THE PREFERRED EMBODIMENT

Figure 1:
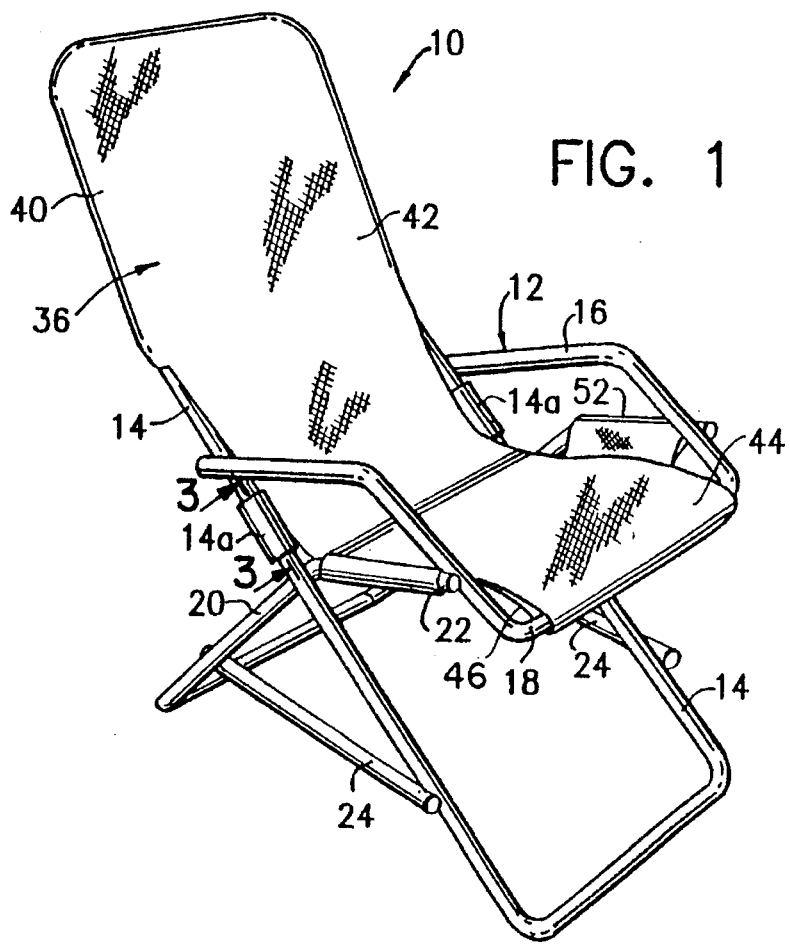
FIG. 1 is perspective view of a chair embodying the invention.

A chair embodying the invention is generally designated 10 in FIG. 1. It comprises a tubular frame 12 including a single generally rectangular tubular back unit 14. Unit 14 serves as both the back support at its upper end and the forward legs at its forward lower end.

Each of the elongate tubular sides of unit 14 can be in two sections, divided intermediate the ends, hinged together and can be selectively held in their continuous linear condition by a sliding sleeve 14a closely circumposing the adjacent ends of the two sections and the hinge and held there by spring detents or the like. Alternatively, the sleeve can be slid longitudinally of the tubular side to permit the two sections to be folded at the hinge for greater compactness in traveling or storage. The nature of the hinge structure will be detailed hereinafter.

An arm unit 16 which is U-shaped and bent downward at a forward location comprises the arms of the chair and the forward crosspiece 18. At the rearward end of the arms the arm unit 16 is pivotally attached respectively to the sides of the back unit 14. A U-shaped rear unit 20 comprises leg elements attached to the arm unit legs. The legs include side portions 22 disposed at a level above the crosspiece 18 for support of the seat-reinforcing web as will be explained. To permit rocking, the rear unit and back unit are not attached.

Finally, separate stabilizing elements 24 are pivotally secured to the rear unit legs and back unit side elements to keep those parts appropriately spaced during the rocking motion and when the chair is still.

The chair further comprises a fabric strip or sling 36 as disclosed in my parent application. The upper rearward portion of the sling 36 has a coextensive back panel (not shown) secured thereto at its top and sides to define a pocket 40 which receives the top of the tubular rear unit. The sling extends downward to constitute a back-supporting portion 42 and a seat-supporting portion 44. The forward lower end of the sling loops around the forward crosspiece 18 and is doubled back under the seat-supporting portion 44 in a tail 46. As shown along the opposite margins of the underside of the seat portion 44 and continuing along the margins of the tail portion as described in the parent application. An elongate seat-reinforcing web 52 of fabric is provided separate from the sling 36. It encircles (FIG. 1) the upper portion of the legs of the rear unit and its opposite ends may be secured together.

The doubled-back section of the tail 46 portion is secured to the support web 52. The arrangement of the tail portion and the seat-reinforcing web 52 can be adjustable as in the parent application or not, as desired.

Figure 3:
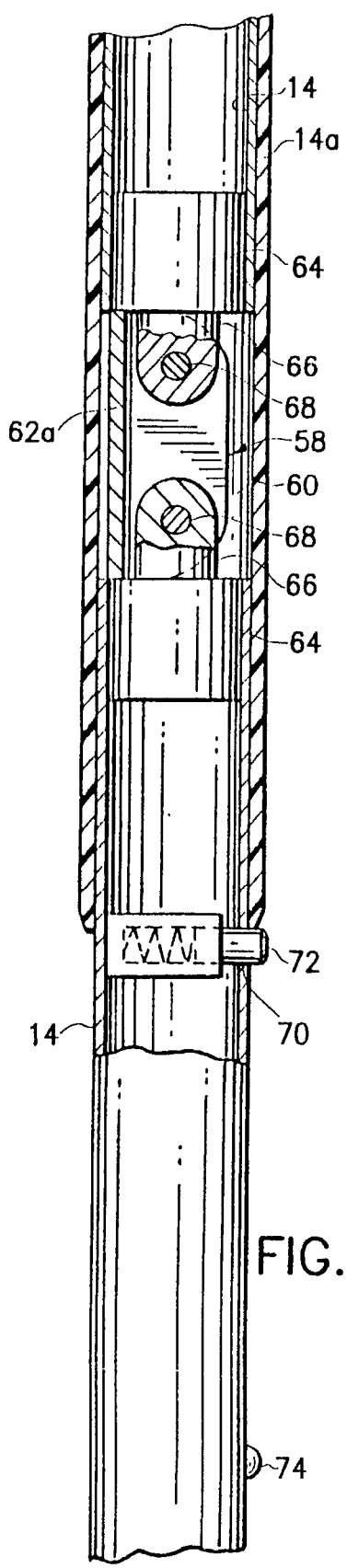
FIG. 3 is an enlarged fragmentary sectional view taken on the line 3—3 of FIG. 1.
Figure 5:
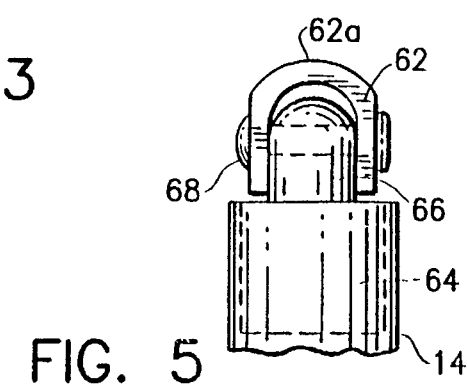
FIG. 5 is a fragmentary side view of the hinge in collapsed condition.

Focusing now on the foldable hinge 58 which includes the sleeve 14a, FIG. 3 shows that the long side element 14 is interrupted intermediate its ends, preferably about at the midpoint. The interruption is generally designated 60. Disposed in the interruption is a knuckle 62, which is shown best in FIG. 5, may be channel-shaped in cross-section. The element 14 at the interruption is provided with fitted plugs 64 respectively which may be secured to the element 14 in an appropriate manner. These plugs are each provided with an axially extending eye 66. The knuckle is formed adjacent opposite ends with openings and pins 68 extend transversely of the hinge respectively through the openings in the eyes 66 and the channel-shaped knuckle 62.

The intermediate web 62a of the knuckle 62 is of a length such that it engages the ends of the element 14 and the associate plugs 64 when the element 14 is in linear condition. Thus, the web 62a serves as a stop preventing the folding of the element 14 in the reverse direction. The corners of the flanges more remote from the web are rounded as shown to facilitate folding. As described, the sleeve 14a closely surrounds in sliding fit the element 14 in the area of the interruption so that when it is positioned as shown in FIG. 3, it assures the maintenance of the linear condition of the back unit 14.

As shown in FIG. 3, the element 14 is perforated as at 70 underneath the sleeve and receives a spring detent 72, such that it keeps the sleeve in the erect position. The connection of the arm unit 16 to the back unit 14 is as shown only slightly above the sleeve 14a in the position shown so that it prevents any considerable movement of the sleeve 14a in the upward direction.

Figure 2:
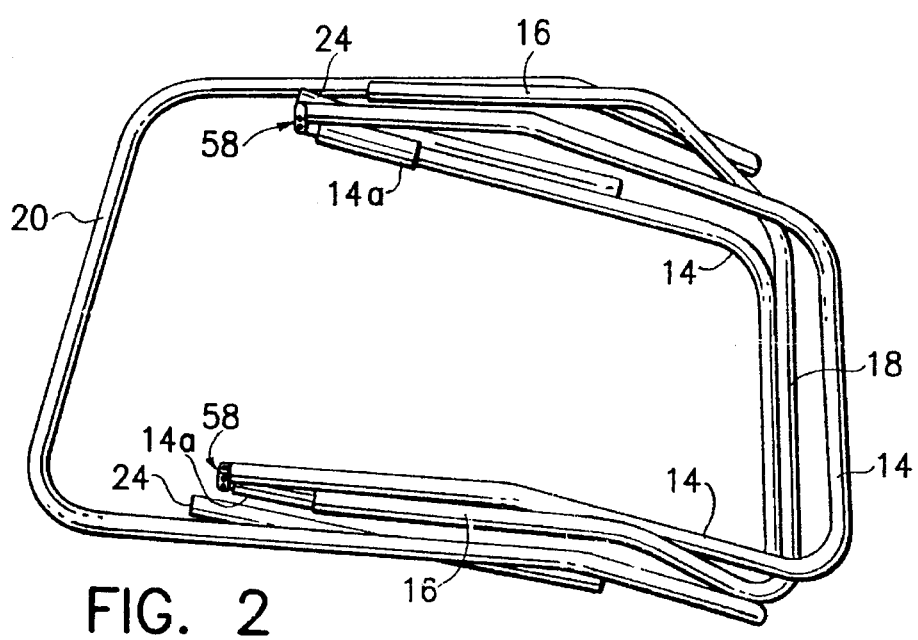
FIG. 2 is a perspective view of the chair frame in folded condition.
Figure 4:
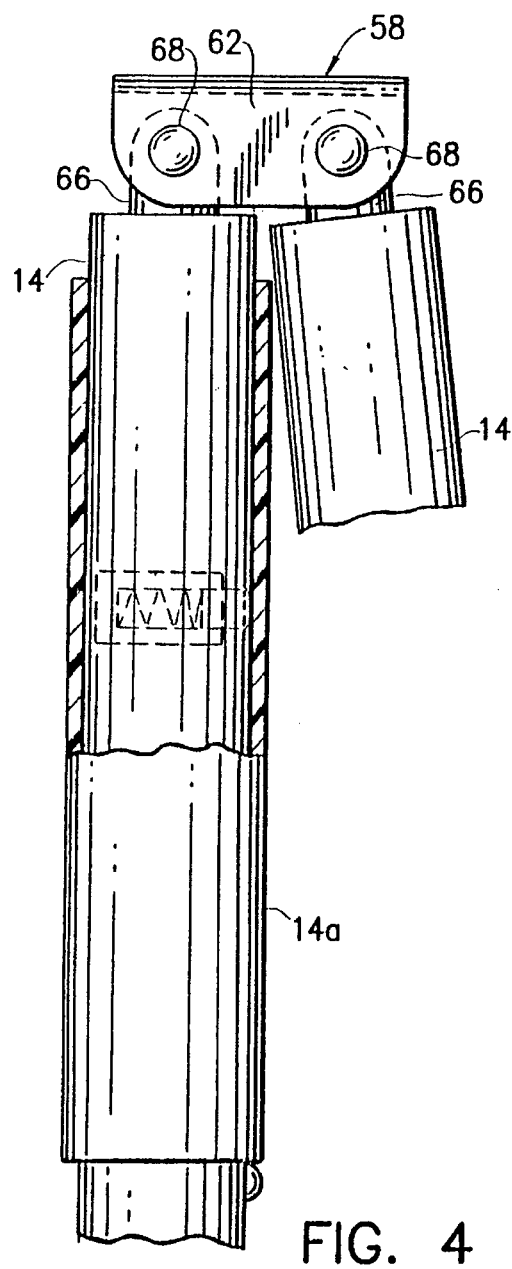
FIG. 4 is a view similar to FIG. 3 in which the hinges is shown in folded condition.

When it is desired to fold the chair frame, it is only necessary to depress the spring detent 72 and to move the sleeve 14a downward over the detent 72 to hit the stop 74, out of the way of the interruption and permitting the hinge 58 as described to be folded. Complete folding of the hinge 58 in the only possible direction, as described, is shown in FIG. 4 and it results in the compact collapse of the frame to relatively flat condition as shown in FIG. 2. Because the back unit is articulated at about the midpoint, as described, the chair in folded condition is only roughly half the length of the back unit, although, as shown, the rear unit 20 may extend somewhat beyond the hinges 58. Thus folded, the frame is readily moved and stored. It will be understood that to effect an interference-free folding, some of the elements may have to be dog-legged or otherwise bent from linear condition.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A collapsible tubular rocking-chair frame comprising:

a. an elongate generally open rectangular back unit having parallel long side elements and parallel upper and lower end elements, the long side elements each being in two tubular sections, the sections of each side element being connected by a selectively foldable hinge comprising a channel-shaped knuckle element having a web and side flanges inbetween the tubular sections, the flanges being apertured in alignment at each end a flat eye element on the ends of each section adjacent the knuckle element and extending into the channel-shaped knuckle element from opposite directions, pins respectively extending through the eyes and flange apertures, the web of the channel being contiguous with the adjacent ends of the tubular sections of the side element when the hinge is in linear condition and the corners of the flanges more remote from the web being rounded to facilitate pivoting, and a sleeve closely surrounding the side element and adapted to selectively slide over the knuckle and the ends of the tubular sections adjacent the knuckle to hold the hinge in linear condition.

b. a generally U-shaped arm unit having a forward bight and rearward legs, the arm unit legs pivotally attached at their distal ends to the respective long sides of the back unit above the hinges, c. a generally U-shaped rear unit having a rearward and downward bight and upward legs, the distal ends of the rear unit upward legs pivotally attached to the respective arm unit legs adjacent the bight of the arm unit, and d. a pair of linear parallel stabilizing elements, one on each side of the frame, having opposite ends pivotally connected respectively to a long side element of the back unit adjacent the lower end element and a rear unit leg adjacent the rear unit bight.

2. A collapsible chair frame as claimed in claim 1 including additionally projection means on the long side elements for holding the sleeve in a position overlying the hinge.

3. A collapsible chair frame as claimed in claim 2 wherein the projecting means is a spring detent.

* * * * *